United States Patent [19]

Meiller

[11] 3,969,261

[45] July 13, 1976

[54] POROUS SUBSTANCES HAVING ION EXCHANGE PROPERTIES

[75] Inventor: Francois Meiller, Palaiseau, France

[73] Assignee: Rhone-Progil, Courbevoie, France

[22] Filed: July 10, 1974

[21] Appl. No.: 486,819

[30] Foreign Application Priority Data

July 13, 1973 France .............................. 73.25698

[52] U.S. Cl. ............................. 252/179; 106/287 S; 260/2.1 R; 428/447
[51] Int. Cl.² .............................................. C02B 1/40
[58] Field of Search ............ 428/447; 252/405, 179; 427/220; 260/2.1; 106/287 S, 287 SB

[56] References Cited
UNITED STATES PATENTS 2,968,616  1/1961  Bernard ........................ 106/287 SB
3,810,843  5/1974  Slusarczuk .................... 106/287 SB

FOREIGN PATENTS OR APPLICATIONS 519,230  12/1955  Canada ............................. 427/220

Primary Examiner—Mayer Weinblatt
Assistant Examiner—Edith Buffalow
Attorney, Agent, or Firm—McDougall, Hersh & Scott

[57] ABSTRACT

An ion exchange substance formed of a porous mineral support having a specific surface area greater than 10 sq.m/g and an organo silicon compound containing at least one amine group in an organic group attached to the silicon atom grafted onto the porous mineral support via the silicon atom of the organo silicon compound and an oxygen group on the support and in which the terminal radicals on the amino group are alkyl groups having from 1 to 3 carbon atoms.

9 Claims, No Drawings

POROUS SUBSTANCES HAVING ION EXCHANGE PROPERTIES

The invention relates to porous substances upon which anionic residues are fixed, rendering them capable of functioning as ion exchangers.

The ion exchangers formed of aminated anionic residues fixed on various organic compounds such as resins, cross-linked dextranes and various cellulose derivatives are well known; however, the working cycles permitted by these exchangers are generally too long despite their suitable exchange capacity, this major drawback deriving from their totally organic nature, which involves a certain compressibility, swelling in solvents, the facility of development of micro-organisms, and the absence of the possibility of sterilization by heat. Moreover, the porous characteristics of the exchangers, even when new, are often poorly suitable.

New porous substances are now proposed which are capable of functioning as ion exchangers and devoid of the above-mentioned drawbacks, the porosity characteristics of which can be determined as a function of the envisaged applications and which are endowed with a sufficient exchange power, which substances are constituted of organic groups each comprising in general at least one atom of silicon, these groups being grafted onto porous mineral supports through the intermediary of connections between the atoms of silicon and the atoms of oxygen derived from hydroxyl groups present on the surface of these supports, and these organic groups each possessing at least one amine function. In order to impart the desired properties to the porous ion exchanger substances according to the invention, these organic groups must comprise between this silicon atom or these silicon atoms and the amine function or functions, an organic group in which at least three carbon atoms are present, the radicals of the amine functions being identical or different alkyls comprising $n$ atoms of carbon, where $n$ can most often be equal to 1, 2 or 3 but can reach 12 or even more in certain particular cases.

By reason of the dimension of the organic group, such a general structural formula sufficiently separates the amine function from the support, which permits access of the molecules of the compounds to be treated by these exchangers, and by reason of the nature of the radicals of the amine functions imparts sufficient basicity to these functions; this basicity would in fact be too slight if these radicals were hydrogen atoms.

The most current processes of synthesis of such organic groups readily result in obtaining quite suitable organic groups, such for example as reacting diethylamine upon γ chloropropyltriethoxysilane; however, very often one obtains more complex substances entering within the above given definition.

Such porous substances having ion exchanger properties can in simple cases be represent diagrammatically by the following figure:

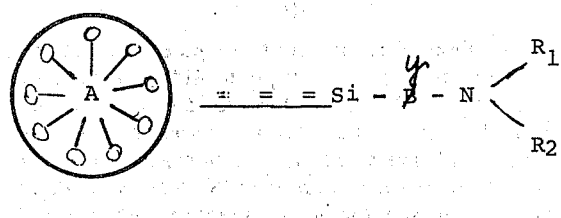

wherein

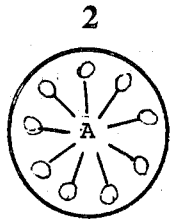

represents a porous mineral support, and wherein

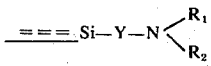

represents the organic group in which — B — represents the organic group intermediate between the silicon atom and the amine function

It should be noted that the silicon atom can be connected to one or more of the oxygen atoms of the support.

The selection of the porous characteristics of the porous ion exchanger substances, according to the invention, is especially related to the dimensions of the molecules of the compounds to be treated by these substances. These porous characteristics are determined primarily by those of the porous mineral supports utilized. These porous characteristics concern mainly the specific surface areas and the porous volume and the distribution of this porous volume among pores of large diameters and pores of small diameters, the quantity of these latter being related with the specific surface area. Obviously the grafting of the organic groups involves a modification of these porous characteristics which is translated by a reduction, more or less considerable according to cases, of the initial specific surface area and porous volume, which must thus be selected accordingly in order to obtain finished products having the desired specific surface areas and porous volumes. Furthermore, certain well known processes, such as the various hydrothermic treatments, which generally permit modification of the porous characteristics of mineral supports, are often usable here, to a certain extent, for the supports onto which the organic groups are grafted as a result of the relative stability of these groups. In practice, as regards the finished ion exchanger porous substances, their specific surface area is advantageously greater than about 10 sq.m/g and the total porous volume can reach and exceed the value of 0.7 cc/g.

The initial mineral supports utilized vary greatly from the point of view of chemical nature and are obtained for example by drying, calcining or more or less extensive thermal or hydrothermal treatment of gels, hydrogels and various hydroxides and hydrated salts, formed of small balls or irregular fragments, which, with a view to the grafting of the organic groups, comprise a more or less large number of their oxygen atoms in the form of hydroxyl groups. The composition of such supports can include silica, alumina, magnesia, the hydroxides of numerous metals, such as titanium, zirconium, thorium, molybdenum, those of the metals of the iron group and in general all those which are insoluble.

Certain of such supports are currently industrially available and, in themselves, form no part of the invention. Other supports can likewise be utilized, such as those obtained by thermal or ceramic methods and those obtained by the setting of hydraulic binders.

However, in many cases, supports are preferable which are constituted principally of silica and in particular of balls of silica gel, for which methods are well known to impart, in various ways, such as by calcining or autoclaving the desired porosity properties and which moreover, by grafting, give Si—O—Si bonds that are particularly firm.

The processes for the manufacture of the new ion exchanger porous substances, according to the invention, are quite varied since it is understood that it is possible to build up their structure by combining their constituent elements in several different ways.

It is, for example, in general possible to start from mineral supports of predefined porous characteristics possessing a more or less great proportion of their oxygen atoms in the hydroxyl groups, and to treat them at ordinary pressure or under pressure in order to apply the organic groups to be grafted, for example, by silanes of the general formula:

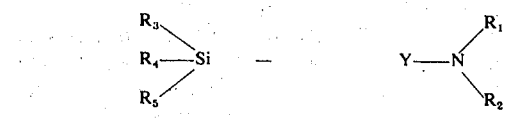

In this formula, at least one of the radicals $R_3$, $R_4$ and $R_5$ is capable of known reaction with the hydroxyls to produce O—Si bonds and are in general halogens, alkoxy or carboxy groups and silazane groups. However, in the particular present case, where the silane utilized possesses an amine function, the radicals likely to react can practically only be alkoxy groups and the most suitable are particularly ethoxy and methoxy groups. The organic group —Y— can be a simple chain —$(CH_2)_n$— in which $n$ is at least equal to 3 and up to 12 but can equally comprise for example a benzene ring.

As variant of the above process, it is possible to treat precursors of these supports, such as freshly prepared hydrogels, with these same silanes and then to effect a development of their porous characteristics by elimination of the excess water.

It is possible to proceed in other manners to obtain grafted groups of the same general formula, starting by grafting a simpler silane without amine function, which gives greater freedom of choice of the radicals $R_3$, $R_4$ and $R_5$ which can then for example be halogens. This silane is moreover necessarily provided with a halogen at the end opposite to the silicon, for example chlorine, or with a double bond permitting of connecting thereto the remainder of the group which must be grafted on the support; these procedures for molecular build-up are well known per se and are not an essential characteristic of the invention.

It is also possible, instead of using solid mineral supports previously treated to obtain the desired porosity characteristics, to start from precursors of these supports in the liquid state upon which the desired silanes are reacted to obtain the desired amino groups in one or more actions, then to effect the gelification or precipitation of the supports, for example, by means of variation of pH values. Such precursors can, for example, be metallic alcoholates, alkaline silicates, organic silicates and sols of various oxides. By this latter manner of preparation, one generally obtains products of quite large surface area which it is, however, possible to modify by cautious treatments, for example, hydrothermic treatments, not likely to destroy the grafted organic groups.

Finally, other variants can be utilized in which one starts by effecting the graftings of the desired silanes upon the liquid precursors of supports, this grafting being followed by sol defecation, as by gelification or any other means, and the addition to the remainder of the amino groups by the known general means indicated above.

It should be noted that the exchange capacities of the porous ion exchanger substances, according to the invention, are generally inferior to those of previously known organic exchangers, but that, in practice however, as a result of the particularly interesting properties of the supports utilized, the working cycles which are obtained by their use are appreciably shorter.

It should also be noted that these ion exchanger porous substances, as a result of the diversity of the utilizable supports, can be provided to work more particularly at a pH value, by selection of a support which is stable at this pH value.

A certain number of examples of preparation of porous ion exchanger substances, according to the invention, are given hereinafter by way of illustration and not of limitation.

EXAMPLE 1

Into an autoclave there are placed 500 g of small balls of silica gel of 100 to 200 $\mu$ diameter having a specific surface area of 406 sq.m/g and a porous volume of 1.04 cc/g and they are dried under a current of nitrogen at normal pressure for 4 hours at 150°C. Then there are added 100 g of the silane having the formula:

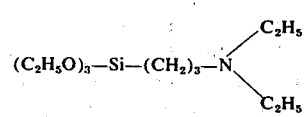

dissolved in 500 ml of xylene and heating is effected for 8 hours at 190°C, the pressure establishing itself at 4.5 bars. The balls, onto which the organic groups derived from the silane are thus grafted, are shaken out, washed with acetone, then with boiling water and finally dried at 120°C under reduced pressure. After this treatment, the specific surface area of the balls is 262 sq.m/g and their porous volume is 0.8 cc/g. The exchange capacity of these balls, after treatment with N/10 hydrochloric acid, in order to quaternize the nitrogen, is measured by the exchange of the chloride ion with a solution of N/10 sodium nitrate. A value of 0.4 eq.m/g is obtained.

EXAMPLE 2

Into a balloon flask having three pipes, an agitator and condenser, there are disposed 400 g of balls of silica gel of 100 to 200 $\mu$ diameter having a surface area of 110 sq.m/g, and a porous volume of 1.7 cc/g, and these balls are dried under a nitrogen current at reduced pressure for 3 hours at 150°C. 80 g of the same silane as that used in the previous example, dissolved in 400 ml of xylene are added and heating is effected under reflux for 8 hours. After cooling the balls are shaken out, washed with acetone, then treated with boiling water for 4 hours. To terminate, the balls are shaken out afresh, washed with acetone, then dried in the oven. After this treatment, the balls have a surface area of 90 sq.m/g, a porous volume of 0.95 cc/g and an exchange capacity of 0.25 eq.m/g, measured as in the previous example.

EXAMPLE 3

In a balloon flask there are disposed 345 ml of sulphuric acid at 120 g/l. With vigorous agitation, a solution of sodium silicate at 220 g/l of silica is added until the pH value reaches 2.5. Then at one time there are added 25 g of the same silane as that used in Example 1, then again some of the previous solution of sodium silicate to pH 3.8. Thus one obtains a sol which is poured, with vigorous agitation, into a balloon flask containing 10 liters of trichloroethylene and an emulsifier. After 15 minutes of agitation, the sol is gelified in the form of micro-balls. The balls are separated by shaking out and treated with 1 liter of an ammoniacal solution of pH 9. After several minutes, the balls are placed upon a filter, washed with acetone, then dried at 120°C under reduced pressure. The balls thus obtained have a mean diameter below 250 $\mu$, their specific surface area is 437 sq.m/g and their porous volume is 0.6 ml/g. Their exchange capacity measured as indicated in the previous examples is 0.5 eq.m/g.

EXAMPLE 4

This example particularly concerns the production of porous ion exchanger mineral substances by prior grafting of a chlorosilane, without amine function, onto supports, this grafting being followed by a treatment by a secondary amine.

In the same balloon flask with agitator and condenser as that used in Example 2, there are disposed 400 g of balls of silica gel of 100 to 200 $\mu$ in diameter, with a specific surface area of 600 sq.m/g and a porous volume of 0.9 cc/g. 80 g of $\gamma$ chloropropyltrichlorosilane dissolved in 400 ml of xylene are added and this mixture is heated under refulx for 8 hours. The balls thus treated are shaken out, washed with acetone, then dried in air for 2 hours. These balls are then put into an autoclave with 40 g of dibutylamine dissolved in 400 ml of toluene and the autoclave is brought to 140°C for 8 hours; the pressure is established at 5 bars. Finally the balls are washed with boiling water, then dried for 4 hours. Their specific surface area is then 440 sq.m/g, their porous volume 0.7 cc/g, and their exchange capacity measured as before is 0.5 eq.m/g.

EXAMPLE 5

This example, like the previous example, concerns a progressive construction of the amino organic group upon a silane previously grafted onto a support.

1150 g of silica gel balls of 100 to 200 $\mu$ diameter, with surface area of 400 sq.m/g and a porous volume of 1.04 cc/g, are dried for 4 four hours at 150°C at a reduced pressure. These balls are placed in a balloon flask with a solution of 230 g of vinyltrichlorosilane dissolved in 2.5 l of xylene and heated to boiling under a reflux for 8 hours. These balls are shaken out, washed with acetone and neutralized by an ammoniacal solution at pH 9. Then the balls thus treated are washed with distilled water to neutrality, then with acetone and finally dried in air. 100 g of this dry product are taken and impregnated with a solution of 20 g of dimethylaminoethyl methacrylate in acetone to which there have been added 0.45 mg of azo bis isobutyronitrile as polymerization catalyst. The acetone is evaporated under reduced pressure in a rotary apparatus and heating is effected for 8 hours at 100°C, under nitrogen, in order to obtain polymerization. Thus one obtains, on the one hand, a copolymerization of the dimethylaminoethyl methacrylate and of the silane grafted onto the silica balls and, on the other, of the polymers of this methacrylate. The product is then treated with dimethylformamide to boiling in order to dissolve these polymers. After shaking out and a final washing with acetone followed by a drying, the balls have a specific surface area of 205 sq.m/g, a porous volume of 0.7 cc/g and an exchange capacity of 0.4 eq.m/g.

EXAMPLE 6

This example concerns the use of a support other than silica. In the same apparatus as that indicated in Examples 2 and 4, there are placed 400 g of an alumina having a specific surface area of 400 sq.m/g and a porous volume of 0.3 cc/g in the form of a powder having a mean granulometry below 200 $\mu$. 80 g of the silane used in Example 1, dissolved in 400 ccs of xylene, are added thereto and heating is effected under reflux for 8 hours. After cooling, the alumina thus treated is shaken out and washed with acetone. After drying it has a specific surface area of 175 sq.m/g, a porous volume of 0.12 cc/g and an exchange capacity of 0.74 eq.m/g.

I claim:

1. Porous substances having anionic ion exchanger properties consisting essentially of a porous mineral support, the surfaces of which have free hydroxyl groups, and at least one organo silicon compound grafted onto the porous mineral support by reaction with hydroxyl groups on the support, in which the organo silicon compound has an amine function in an organic group separated from the silicon atom by at least three carbon atoms and in which the porous substance has a specific surface area greater than 10 sq.m/g.

2. Porous substances according to claim 1 in which the porous volumes are greater than 0.7 cc/g.

3. Porous substances according to claim 1 in which the amino function is a dialkyl amine in which each of the alkyl groups contain 1 to 3 carbon atoms.

4. Porous substances according to claim 1 in which the porous mineral supports are silica supports.

5. Process for the manufacture of porous substances according to claim 1, comprising in treating solid porous mineral supports possessing superficial hydroxyl groups with silanes having the general formula:

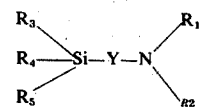

wherein at least one of the radicals $R_3$, $R_4$ and $R_5$ is an alkoxy radical and wherein Y is an organic group in which at least three atoms of carbon are present, the radicals $R_1$ and $R_2$ of the amine function being identical or different alkyls having from 1 to 3 carbon atoms.

6. Process for the manufacture of porous substances according to claim 1, characterized in that the porous mineral support is first reacted with an organo silane having an organic group attached to the silicon atom containing a halogen group separated from the silicon atom by at least 3 carbon atoms and then replacing the halogen group with a secondary amino group.

7. Process for the manufacture of porous substances according to claim 1, characterized in that the supports onto which the silane is grafted is a silica gel.

8. Process as claimed in claim 5 in which the alkoxy radical is selected from the group consisting of methoxy and ethoxy.

9. Process as claimed in claim 5 in which the organic group Y has from 3 to 12 carbon atoms.

* * * * *

UNITED STATES PATENT OFFICE
CERTIFICATE OF CORRECTION

Patent No. 3,969,261        Dated  July 13, 1976

Inventor(s)  Francois Meiller

It is certified that error appears in the above-identified patent and that said Letters Patent are hereby corrected as shown below:

Column 2, line 16, change "B" to --- Y ---

Signed and Sealed this

Nineteenth Day of October 1976

[SEAL]

Attest:

RUTH C. MASON
*Attesting Officer*

C. MARSHALL DANN
*Commissioner of Patents and Trademarks*